March 5, 1957     J. C. STEELE     2,784,376
STATIC CHARGE INDICATOR

Filed Oct. 22, 1953     2 Sheets-Sheet 1

John C. Steele
INVENTOR.

BY

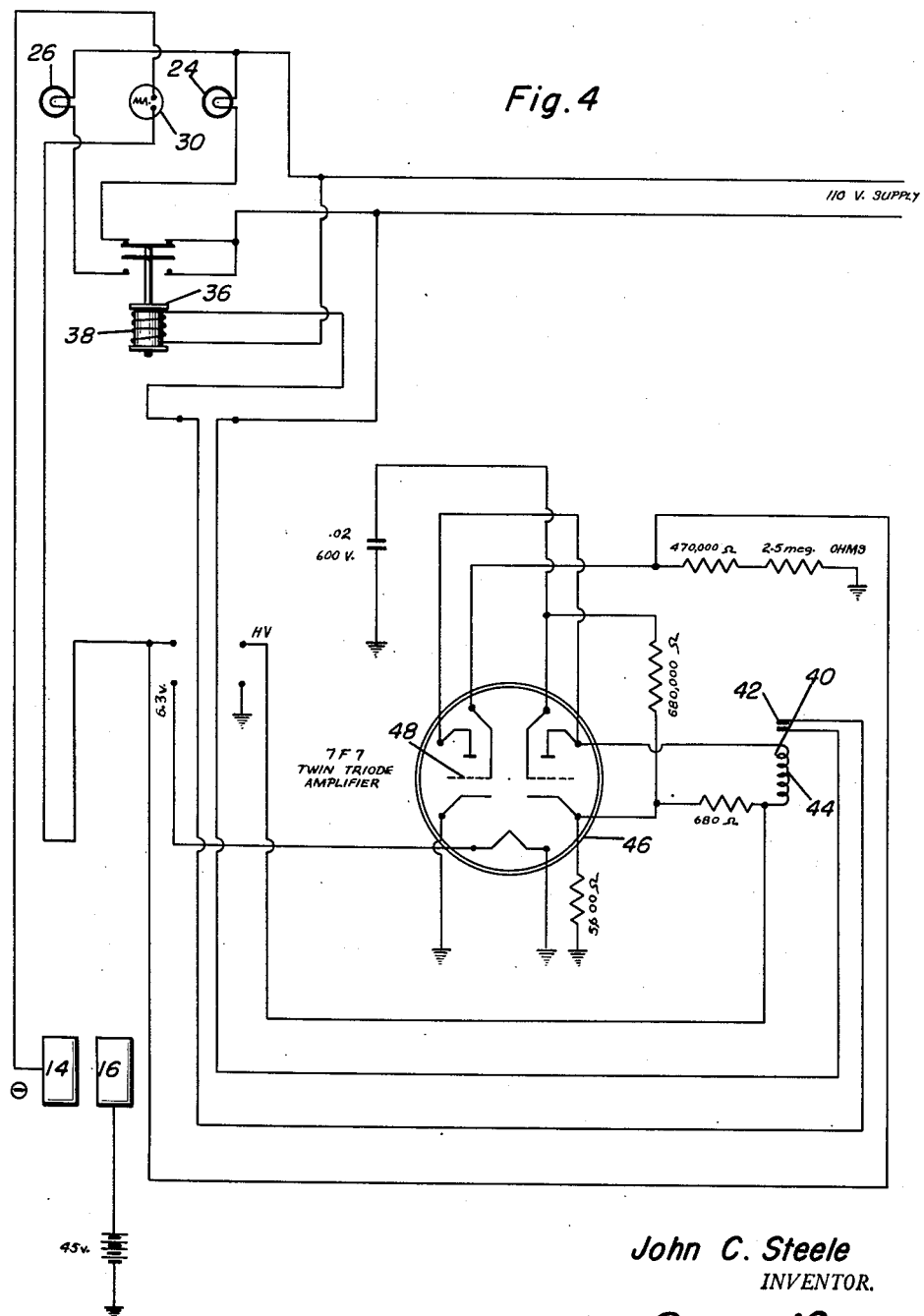

United States Patent Office 2,784,376
Patented Mar. 5, 1957

2,784,376

STATIC CHARGE INDICATOR

John C. Steele, San Angelo, Tex.

Application October 22, 1953, Serial No. 387,765

1 Claim. (Cl. 324—62)

This invention relates to the class of electrical testing apparatus and more particularly to a device for determining whether a person or object to be taken into a hazardous area carries a static charge of electricity.

As is well known, the fumes of certain anesthetics are highly explosive. The discharge of static electricity may be sufficient to cause an explosion of these volatile gases and therefore, the primary object of the present invention resides in the provision of an apparatus for determining whether a person carries a static charge of electricity by determining whether or not that person or object is insulated from a conductive flooring.

Many industrial areas are of the nature that volatile gases and explosive dust may be present. The device comprising the present invention comprises an instrument including a platform having a pair of conductive plates mounted thereon on which a person may step to determine whether or not the foot gear which he is wearing is of an insulative nature. If such foot gear is of insulative nature, it is obvious that he may carry a static charge, and an instrument panel is provided so as to give a warning of such unsatisfactory condition. If, however, the foot gear is of a noninsulative character, a different signal will be provided indicating permission to enter the hazardous area.

Obviously, in conjunction with the foot plates, suitable test leads may be detachably secured to the contact plates, and these may be utilized to test any other type of desired object.

Still further objects and features of the invention reside in the provision of a continuity tester for hazardous areas, a preferred embodiment having been illustrated in the accompanying drawings, by way of example only, wherein.

Figure 3:
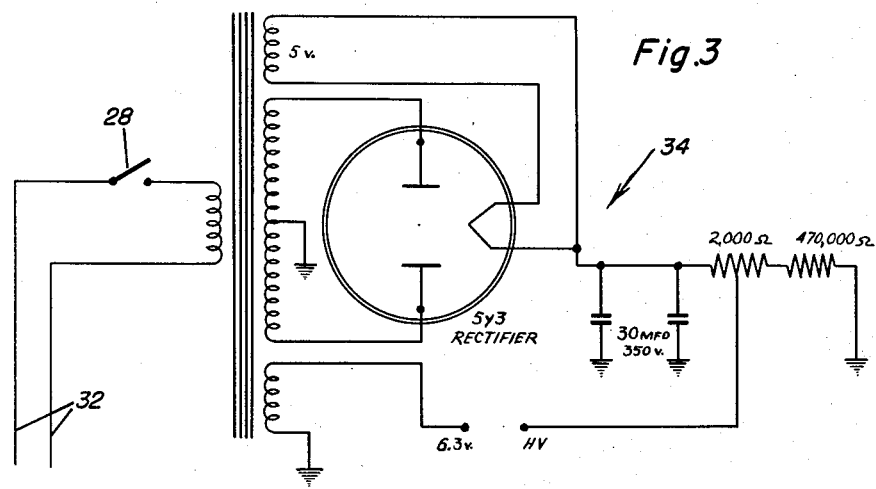
Figure 2:
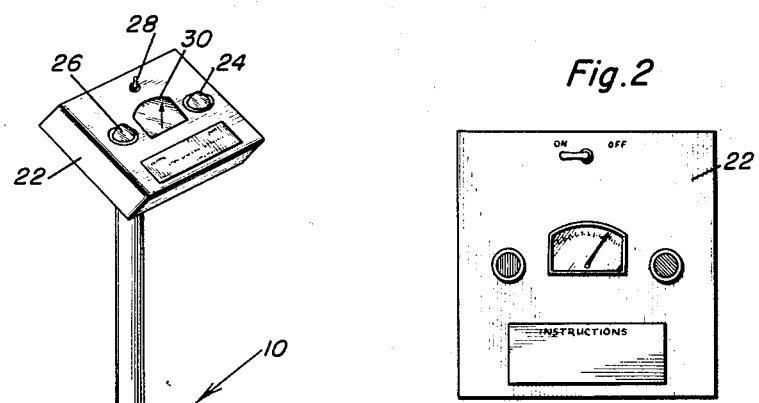
Figure 2 is a plan view of the instrument panel comprising one of the elements of the invention.
Figure 1:
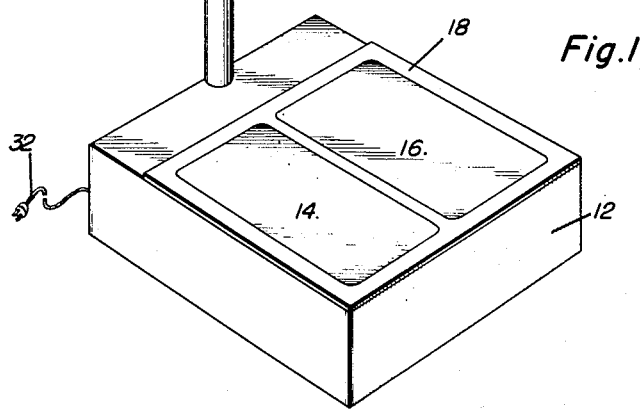
Figure 1 is a perspective view of the continuity tester comprising the present invention.

Figure 3 is a wiring diagram illustrating the electrical components of the means for converting alternating current into direct current supply for other elements of the invention; and Figure 4 is a wiring diagram of the component elements of the instrument panel and the means for actuating and exciting the signal devices mounted on the instrument panel, and further showing the connection between the instrument panel and the foot engageable plates mounted on the platform.

With continuing reference to the accompanying drawings wherein like reference numerals designate similar parts throughout the various views, reference numeral 10 generally designates the continuity tester comprising the present invention which includes a platform 12 having a pair of copper contact plates 14 and 16 mounted thereon, the contact plates 14 and 16 being insulated from each other and embedded in an insulative body 18 carried by the platform 12. Extending upwardly from the platform 12 is a tubular standard 20 which both supports an instrument panel 22 and provides a conduit through which electrical connectors can extend for electrically operatively connecting the instruments carried by the panel 22 with the electrical components mounted in the platform 12.

The instrument panel 22 has a first indicator lamp preferably colored red and generally designated by reference numeral 24 mounted thereon as well as a second indicator lamp 26 preferably green in color. A switch 28 is mounted on the instrument panel 22 but may be otherwise mounted in another convenient place and controls a flow of current from the initial source of power, such as a conventional 110 v. outlet supply box. A milliameter is also mounted in the instrument panel 22 and is generally designated as at 30.

The continuity tester 10 may be connected through suitable conductors 32 to the 110 v. source of power. This electrical power is then rectified and transformed through the circuit, as illustrated in Figure 3, which includes a rectifier to a relatively high plate voltage. This rectifying and transforming circuit is generally indicated by reference numeral 34.

As can be readily seen from an inspection of Figure 4, the indicator lamps 24 and 26 are connected to the electrical power supply through a single pole double throw relay 36, one side of the relay being normally closed, thus normally connecting the indicator lamp 24 to the source of power supply. However, when the coil 38 of the relay 36 is energized, the other set of contacts will be closed, opening the circuit to the lamp 24 and closing the circuit to the indicator lamp 26. The coil 38 is connected to the power supply circuit through a relay generally indicated at 40 including a pair of contacts 42 which are normally open and which are controlled by the coil 44 which receives current when the twin triode type amplifier indicated at 46 is firing due to the fact that the grid 48 thereof receives a less negative bias due to the fact that the circuit thereto is closed when conductive foot gear being worn by a person engage the plates 14 and 16. When current is induced in the coil 44, the contacts 42 will be closed, thereby completing an operative electrical circuit through to the coil 38 which excites the relay 36 and causes the lamp 26 to be activated.

Inasmuch as the lamp 24 will continue to be excited if a person with insulated foot gear steps upon the plates 14 and 16, a proper warning that he may be carrying a static charge of electricity will be provided. If, however, the person is properly grounded by non-insulative foot gear, the lamp 26 will be activated.

An indication of the relative conductivity of the wearer's foot gear will be provided since the milliameter 30 is operatively electrically connected in circuit with the plates 14 and 16.

Since from the foregoing, the construction and advantages of this continuity tester are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

What is claimed as new is as follows:

A continuity testing device for hazardous areas comprising a platform, a pair of foot engageable conductive plates mounted on said platform, said conductive plates being embedded in insulating material and being insulated from each other, an indicator panel secured to a standard rising from said platform, a source of electrical power, a first indicator lamp and a second indicator lamp, a relay for controlling flow of electrical power to said first and second indicator lamps, said relay being normally in a position allowing current to flow to said first indicator lamp and de-activate said first indicator lamp when a person wearing non-insulated foot gear stands on said plates, said means including an amplifier electrically connected in circuit with said plates controlling the operation of a control relay to permit flow of current to said first recited relay to operate said first recited relay so as to excite said second indicator lamp, and a milliameter on said panel electrically operatively connected in circuit with said plates for indicating the relative conductivity of the foot gear.

References Cited in the file of this patent
UNITED STATES PATENTS

| | | |
|---|---|---|
| 2,586,125 | Blarcom | Feb. 19, 1952 |
| 2,626,982 | Collins | Jan. 27, 1953 |
| 2,653,296 | Weaver | Sept. 22, 1953 |